United States Patent
Gratz et al.

(10) Patent No.: US 9,003,997 B2
(45) Date of Patent: Apr. 14, 2015

(54) VESSEL HAVING EXTENSIONS FOR SUPPORTING SWIM PLATFORM AND CONCEALING OUTBOARD ENGINES

(71) Applicant: S2 Yachts Inc., Holland, MI (US)

(72) Inventors: Christopher M. Gratz, Port St. Lucie, FL (US); Bruce F. Thompson, Rockledge, FL (US); Linwood Addison Fuller, IV, Fort Pierce, FL (US)

(73) Assignee: S2 Yachts Inc., Holland, MI (US)

( * ) Notice: Subject to any disclaimer, the term of this patent is extended or adjusted under 35 U.S.C. 154(b) by 195 days.

(21) Appl. No.: 13/719,697

(22) Filed: Dec. 19, 2012

(65) Prior Publication Data

US 2013/0160695 A1 Jun. 27, 2013

Related U.S. Application Data

(60) Provisional application No. 61/579,337, filed on Dec. 22, 2011, provisional application No. 61/705,874, filed on Sep. 26, 2012.

(51) Int. Cl.
 B63B 17/00 (2006.01)
 B63B 1/08 (2006.01)
 B63B 29/02 (2006.01)
 (Continued)

(52) U.S. Cl.
 CPC ............. *B63B 17/00* (2013.01); *Y02T 70/127* (2013.01); *B63B 1/08* (2013.01); *B63B 29/02* (2013.01); *B63H 20/04* (2013.01); *B63H 21/36* (2013.01); *B63B 2029/022* (2013.01)

(58) Field of Classification Search
 CPC ........... B63B 17/00; B63B 1/08; B63B 29/02
 USPC .............................................. 114/362; 440/53
 See application file for complete search history.

(56) References Cited

U.S. PATENT DOCUMENTS 2,370,508 A 2/1946 Wilkie
3,452,704 A 7/1969 Watkins
(Continued)

FOREIGN PATENT DOCUMENTS

FR 2467774 4/1981
JP 08-187038 7/1996

OTHER PUBLICATIONS

PCT/US2012/0070926 ISR, Apr. 23, 2013, S2 Yachts, Inc.
(Continued)

*Primary Examiner* — Lars A Olson
*Assistant Examiner* — Jovon Hayes
(74) *Attorney, Agent, or Firm* — Price Heneveld LLP

(57) ABSTRACT

A vessel, including a transom for mounting outboard engines thereto, is spanned on opposite sides by aft-facing hull extensions which extend beyond the engines and allow a swim platform to be positioned between the hull extensions. The design allows the outboard engines to be covered with an engine cover, which provides an attractive vessel design in which the outboard engines can be concealed with a cover, which may serve other functions, such as a seat or the like. The cover houses an engine cowl mist shield which includes a support frame surrounding one or more outboard engines. The frame includes aperture(s) with edges spaced from the cowl and a flexible member extending from the edges to the cowl below the air intake of the cowl, such that spray and mist from the operation of the vessel does not reach the air intake of the cowl.

37 Claims, 15 Drawing Sheets

(51) Int. Cl.
  *B63H 20/04*  (2006.01)
  *B63H 21/36*  (2006.01)

(56) References Cited

U.S. PATENT DOCUMENTS

| | | | |
|---|---|---|---|
| 3,548,428 A | 12/1970 | Eades | |
| 3,943,586 A | 3/1976 | Palmer | |
| 4,584,959 A | 4/1986 | Allison | |
| 4,669,414 A * | 6/1987 | Molino | 114/343 |
| 4,742,795 A * | 5/1988 | DePrey et al. | 114/362 |
| 4,813,365 A | 3/1989 | Lindstrom et al. | |
| 4,913,079 A | 4/1990 | Nishino | |
| 5,176,551 A * | 1/1993 | Blanchard et al. | 440/88 R |
| 5,224,436 A | 7/1993 | Stricker | |
| 5,307,755 A | 5/1994 | Lumpkin | |
| 5,349,919 A | 9/1994 | Douglass | |
| 5,390,624 A | 2/1995 | Barnes | |
| 5,409,409 A | 4/1995 | Blanchard et al. | |
| 5,452,675 A | 9/1995 | Devin | |
| 5,562,511 A | 10/1996 | Blanchard et al. | |
| 5,572,944 A * | 11/1996 | Slikkers et al. | 114/343 |
| D384,321 S | 9/1997 | Anderson | |
| 5,791,952 A | 8/1998 | Trinkl | |
| 5,833,502 A | 11/1998 | Anderson | |
| 5,983,823 A | 11/1999 | Allison | |
| 6,000,357 A | 12/1999 | Allison | |
| D429,682 S | 8/2000 | Garland et al. | |
| 6,302,050 B1 * | 10/2001 | Ziehm | 114/343 |
| 6,425,341 B1 | 7/2002 | Devin | |
| 6,497,594 B1 * | 12/2002 | Towner et al. | 440/53 |
| 6,675,736 B1 | 1/2004 | Schreiber et al. | |
| 6,837,173 B2 * | 1/2005 | Eck et al. | 114/55.53 |
| D515,009 S * | 2/2006 | Stepp | D12/317 |
| 7,162,969 B2 * | 1/2007 | Houlder et al. | 114/362 |
| 7,185,599 B1 | 3/2007 | Griffiths et al. | |
| D547,256 S | 7/2007 | Kalil | |
| 7,237,503 B2 * | 7/2007 | Stepp | 114/361 |
| 8,028,639 B2 * | 10/2011 | Rodger | 114/357 |
| 8,375,880 B1 * | 2/2013 | St. Clair et al. | 114/362 |
| 8,795,012 B2 * | 8/2014 | Ooishi et al. | 440/61 G |
| 2007/0006789 A1 | 1/2007 | Davidson et al. | |
| 2009/0078187 A1 * | 3/2009 | Rodger | 114/355 |
| 2009/0227157 A1 * | 9/2009 | Mochizuki | 440/53 |
| 2011/0232557 A1 | 9/2011 | Kilgore | |
| 2011/0303142 A1 | 12/2011 | Craze et al. | |
| 2012/0028517 A1 * | 2/2012 | Mochizuki et al. | 440/53 |
| 2013/0160695 A1 * | 6/2013 | Gratz et al. | 114/362 |

OTHER PUBLICATIONS

Exhibit A—19 pages of what appears to be seven purchase agreements for an unidentified Interpid 50 sport yacht received from Interpid Powerboats on Oct. 4, 2012.

Exhibit B—two-page printout of BoatShowBuss.com apparently published on Mar. 25, 2011 received from Intrepid Powerboats on Oct. 4, 2012.

Exhibit C—4 pages of emails between Lee Robbins and Mark Beaver dated in Aug. 2009 received from Intrepid Powerboats on Oct. 4, 2012.

Exhibit D—Unidentified drawing received from Intrepid Powerboats on Oct. 4, 2012.

\* cited by examiner

VESSEL HAVING EXTENSIONS FOR SUPPORTING SWIM PLATFORM AND CONCEALING OUTBOARD ENGINES

CROSS-REFERENCE TO RELATED APPLICATIONS

This application claims priority under 35 U.S.C. §119(e) and the benefit of U.S. Provisional Application No. 61/579,337 entitled VESSEL HAVING EXTENSIONS FOR SUPPORTING SWIM PLATFORM AND CONCEALING OUTBOARD ENGINES, filed on Dec. 22, 2011, by Christopher Gratz, et al., and U.S. Provisional Application No. 61/705,874, entitled ENGINE COWL MIST SHIELD, filed Sep. 26, 2012, by Christopher Gratz, et al., the entire disclosures of which are incorporated herein by reference.

BACKGROUND OF THE INVENTION

The present invention relates to vessels, such as recreational boats employing outboard engines.

Vessels, such as pleasure boats, powered with multiple outboard engines are becoming increasingly popular as they provide desired performance and are relatively economical to acquire. As emission standards become stricter, inboard/outdrive type propulsion systems for pleasure vessels meeting new standards are becoming more expensive, thereby making an outboard driven vessel even more attractive to the consumer. Inboard/outdrive vessels have some features, for example, a rear deck and/or swim platform areas, which are not available on vessels with an outboard engine or engines mounted on the transom. Typically, outboard engines extend from the transom aft and do not allow space behind the engine for such amenities. Swim ladders are frequently mounted to the transom of outboard powered vessels but have limited use only for ingress and egress onto the vessel when the outboard engine is not in operation. Some inboard/outdrive vessels, however, as well as conventional inboard driven vessels, have swim platforms which can be relatively extensive and provide convenience to the vessel operator and passengers in many instances while getting onto or off of a vessel, as well as when anchored and engaging in recreational activities, such as swimming, lounging, and the like. Thus, it would be desirable to have such a feature with an outboard powered vessel.

SUMMARY OF THE INVENTION

The vessel of the present invention satisfies this need by providing several unique features to the hull design, including a transom for mounting one or more outboard engines thereto which is spanned on opposite sides by aft-facing hull and deck extensions which extend the sides and part of the hull aft beyond the transom. This allows a swim platform to be positioned between the hull extensions and behind the outboard engines. Additionally, the design allows the outboard engine or engines to be covered to provide an attractive vessel design in which the outboard engines are concealed. The cover may serve other functions, such as providing seating, a sun pad, or other amenities. Such a cover may be opened or include an opening hatch to allow easy access to the engines for servicing. By integrating extensions to the hull which extend aft beyond the transom, an entirely unique vessel design is provided allowing amenities, such as a walkthrough to a swim platform, seating, and/or sun pads, to be incorporated in an outboard powered vessel in previously unavailable areas. With or without an added swim platform, the extensions allow the outboard engine or engines to be covered to present a vessel which has the appearance of an inboard driven vessel but with the performance and cost effectiveness of using outboard engines.

Vessels embodying this invention include a hull with a transom for holding at least one outboard engine and starboard and port hull extensions formed on the hull and deck and extending toward any outboard engine mounted to the transom. Vessels embodying this invention may also include an engine cover positioned on the hull and over an outboard engine when mounted to the transom and supported, at least in part, by the hull extensions. Vessels embodying the invention may further include a swim platform between the hull extensions aft of the area occupied by an outboard engine. A swim platform may be integrally formed at an aft end of the engine cover which may include a hatch for providing access to the outboard engine. The engine well of a covered engine of this invention includes a mist shield surrounding the engine cowl, wherein the shield has a flexible member extending into engagement with the engine cowl. In one embodiment, the flexible member comprises bristles of a brush extending from the edges of the mist shield to the engine cowl. The mist shield may be a pivoted frame movable between engine operating and servicing positions. The engine cover includes air inlets to provide combustion air for the engine(s).

These and other features, objects and advantages of the present invention will become apparent upon reading the following description thereof together with reference to the accompanying drawings.

DETAILED DESCRIPTION OF THE PREFERRED EMBODIMENT

Figure 1:
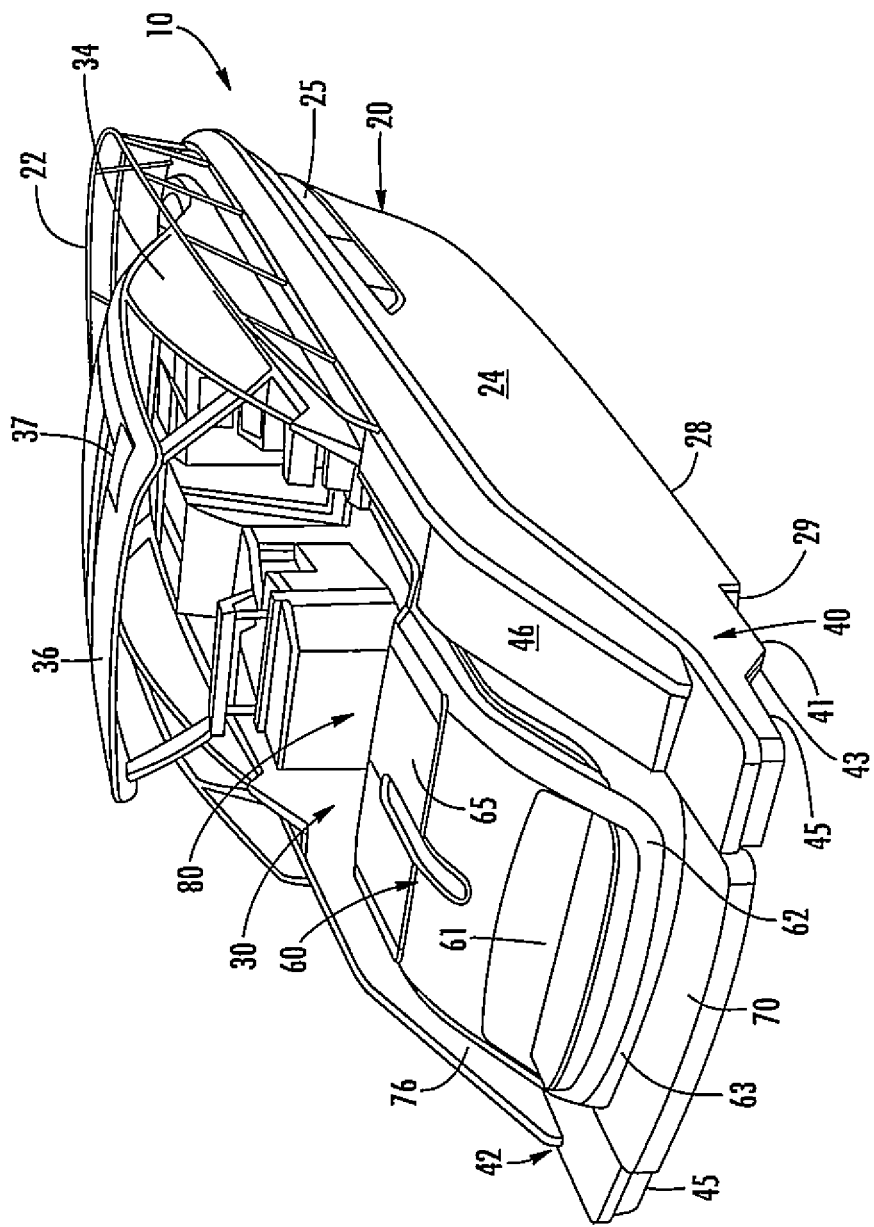
FIG. 1 is a rear perspective view of a vessel embodying the present invention.

Referring initially to FIGS. 1-5, there is shown a vessel 10 including a hull 20 and deck 30. The deck 30 includes a bridge deck area with the usual amenities, including a windshield 32, side windows 34, a hard top 36 for the bridge deck, and electronics 38 mounted to the hard top (FIGS. 2-5). The top may include a sunroof 37 (FIGS. 2 and 3), which can be opened and closed. The deck 30 supports handrails 22 assisting operators access to the bow area 21 of the vessel.

Figure 2:
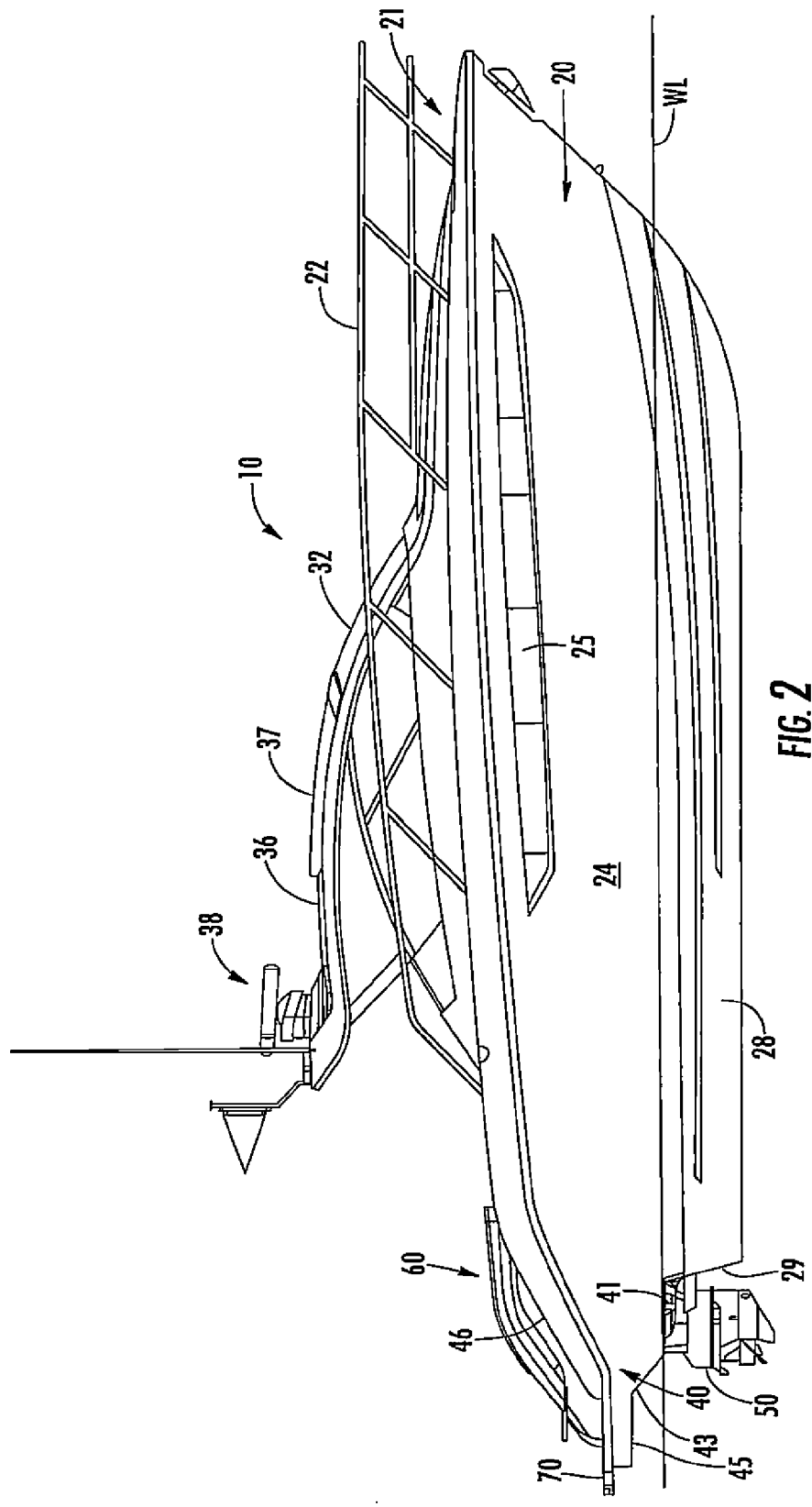
FIG. 2 is a right side elevational view of the vessel shown in FIG. 1, shown with the water line identified.
Figure 3:
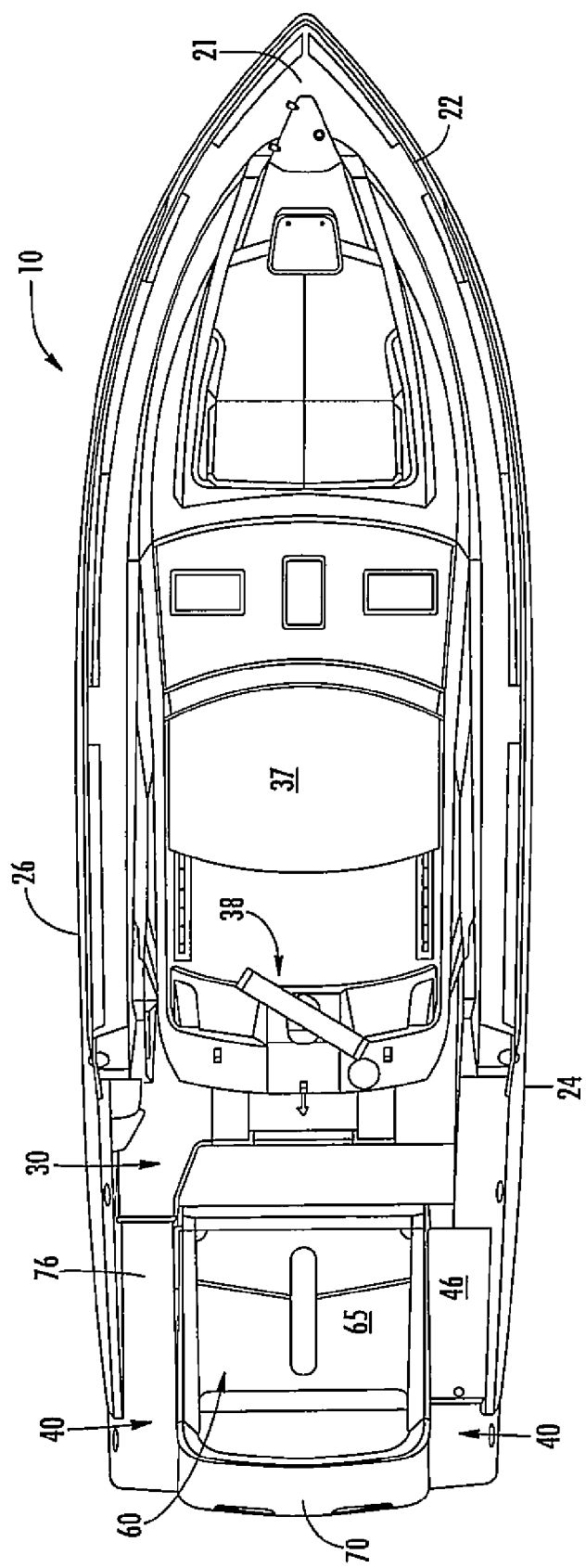
FIG. 3 is a top plan view of the vessel shown in FIGS. 1 and 2.
Figure 4:
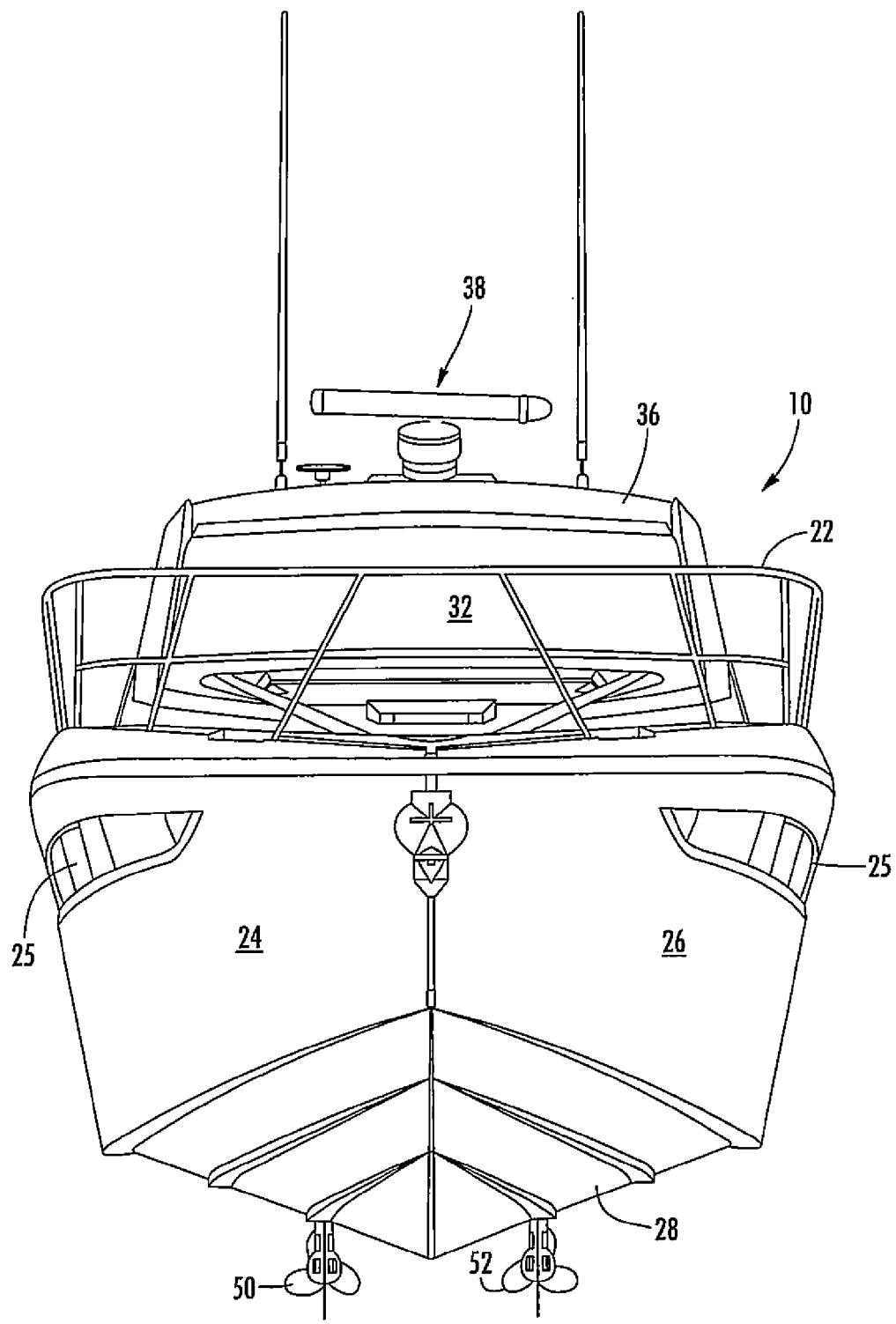
FIG. 4 is a front elevational view of the vessel.
Figure 5:
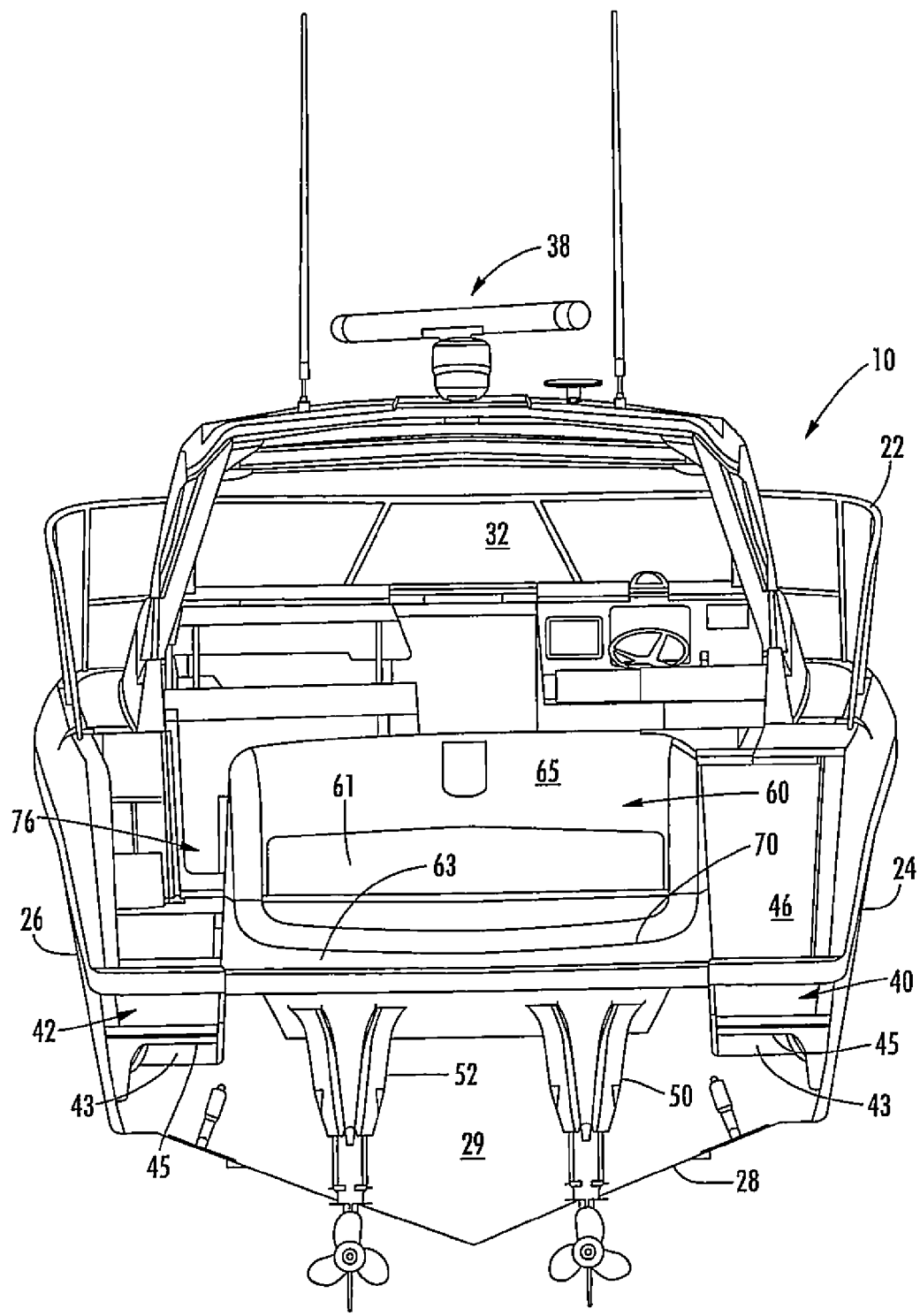
FIG. 5 is a rear elevational view of the vessel.
Figure 6:
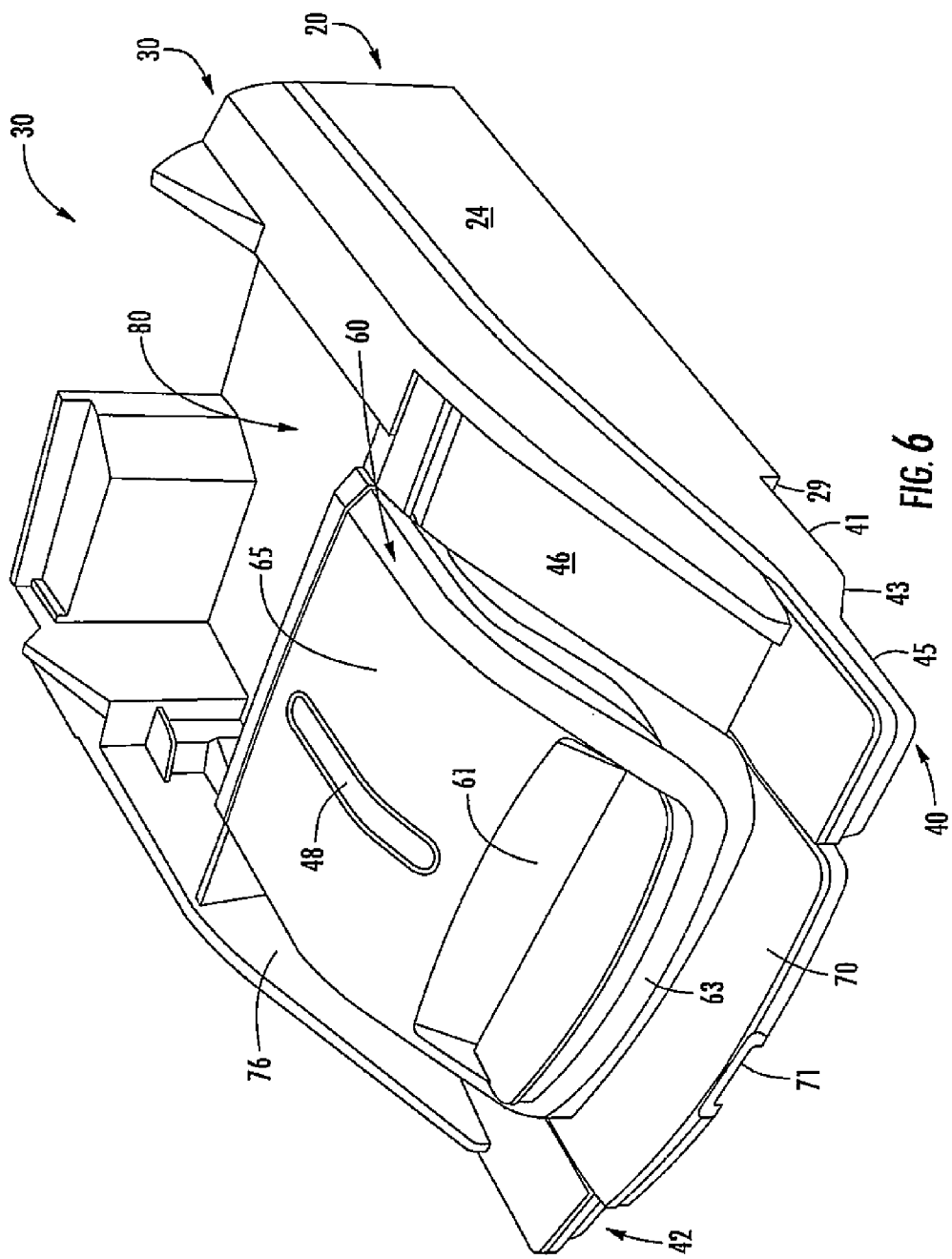
FIG. 6 is a fragmentary rear perspective view of the stern of the vessel, showing the engine cover and cover hatch.
Figure 13:
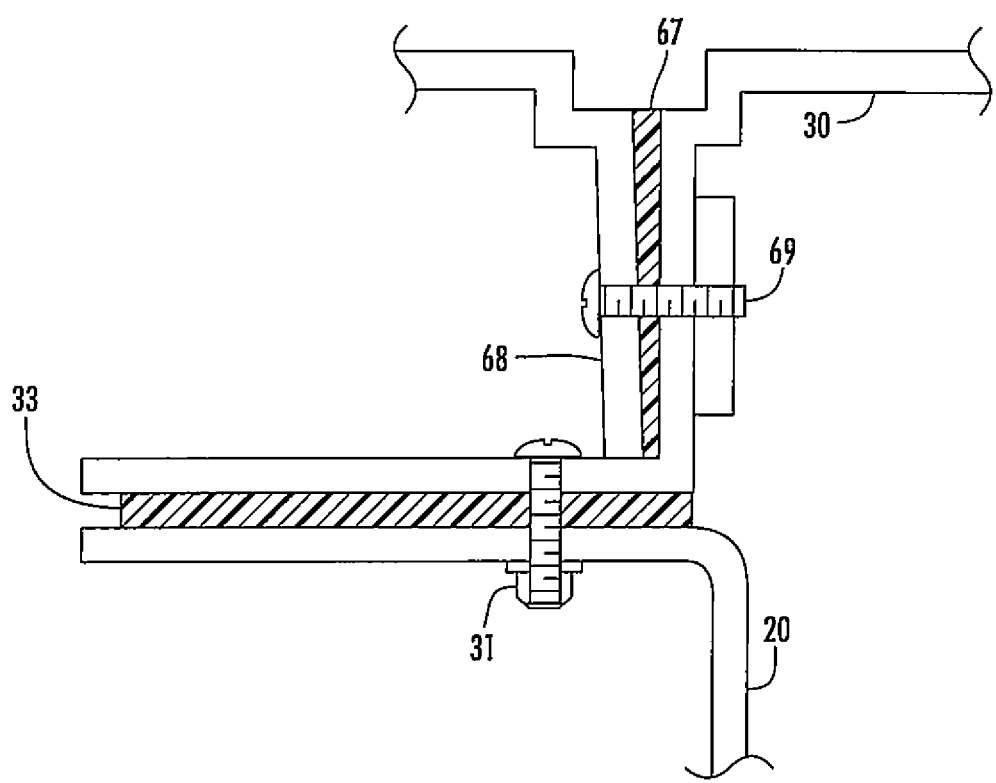
FIG. 13 is a fragmentary cross-sectional view illustrating the deck and hull junction and the engine cover junction to the deck.

The hull 20 includes a starboard side 24 and a port side 26 which are integrally molded with the bottom 28 and transom 29 (FIGS. 1, 2, 5, 10, and 11). Hull 20 and deck 30 are unique in that they include hull extensions 40 and 42 on the starboard and port sides, respectively, which are integral with the sides 24 and 26 and the bottom 28 of the hull. Hull 20 and deck 30 are made of fiberglass reinforced plastic (FRP) typically integrally molded and joined in a conventional manner. At the extensions 40, 42, the two members are joined in a sealed watertight connection, as seen in FIG. 13 discussed below. The hull may, as illustrated in FIGS. 1 and 2, include ports 25, which are sealably enclosed with suitable watertight transparent port covers for providing natural light to the living quarters within hull 20.

The stern of the vessel includes a transom 29 extending upwardly from the bottom 28 (FIGS. 1, 2, 5, 10, and 11) to which a pair of outboard engines 50 and 52 are mounted for providing propulsion for vessel 10. The vessel 10 may include one or several engines (three or four or more) mounted to the transom depending upon the size of the vessel. Hull extensions 40 and 42 are substantially symmetrical and include horizontally extending lower first sections 41 (FIGS. 1, 2, and 6-8) on each of the port and starboard sides of the vessel. The lower surface of first sections 41 are slightly below the water line (WL) in relation to the hull 20, as best seen in FIG. 2, but do not form part of the performance characteristics of the vessel controlled by the shape of bottom 28. Thus, the lower surface of sections 41 is not visible and, as seen in FIG. 2, extends to an observer to what appears to be the waterline of the vessel, which can range in size from 24 to 40 feet or longer.

Figure 8:
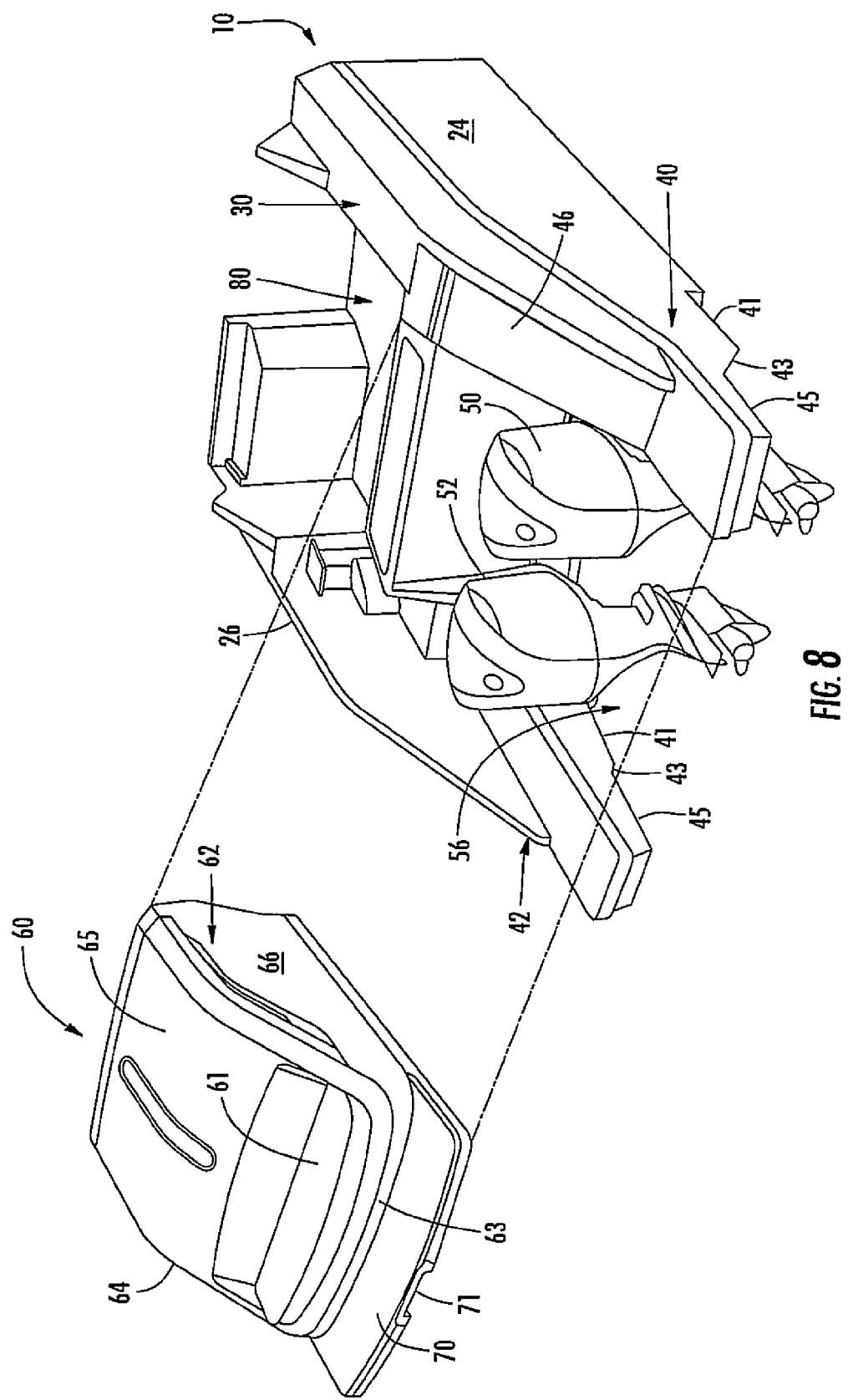
FIG. 8 is an exploded fragmentary perspective view, showing the stern of the vessel and the engine cover.
Figure 9:
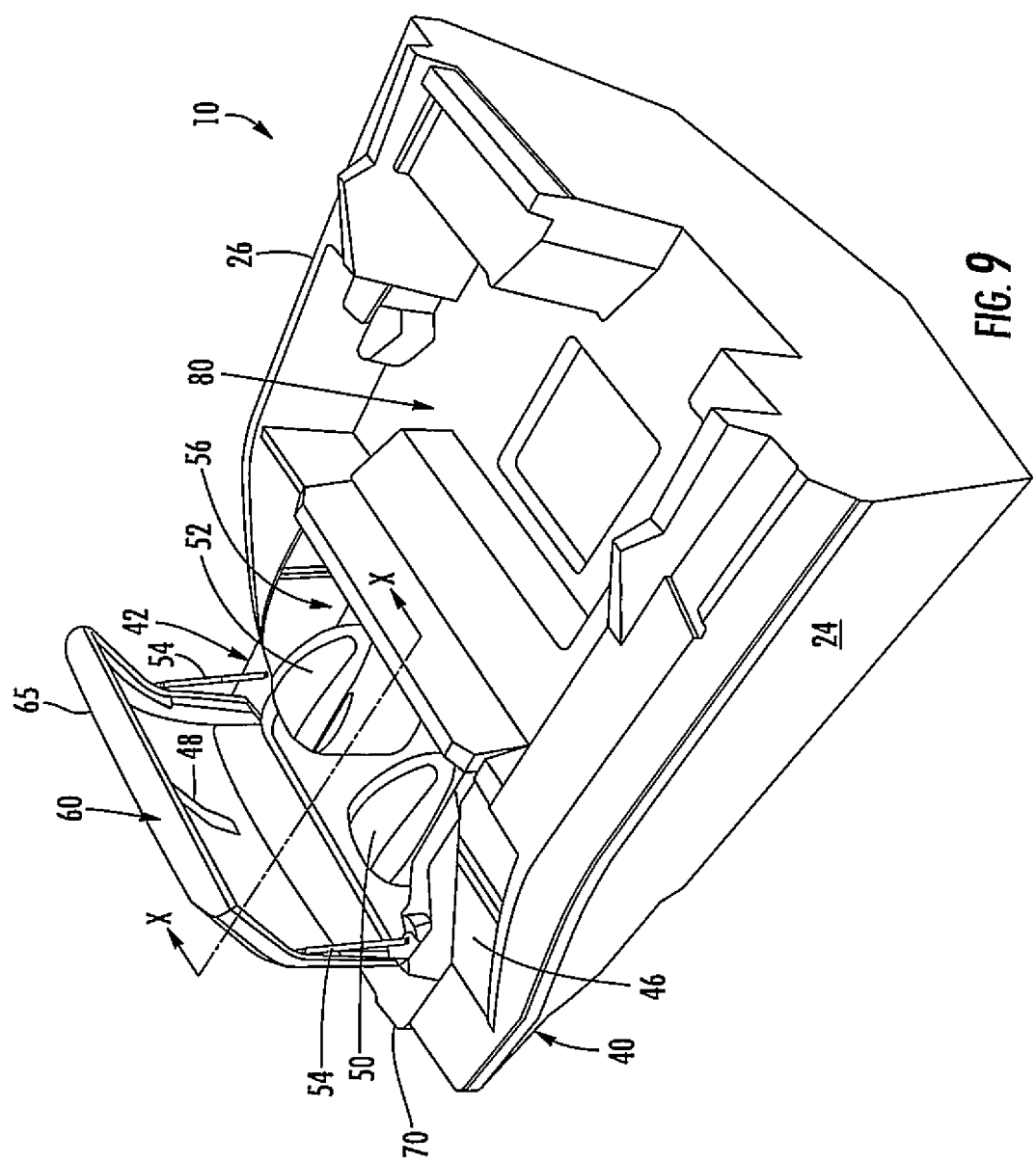
FIG. 9 is a fragmentary perspective view looking aft on the vessel, shown with the engine cover hatch in an open position.
Figure 11:
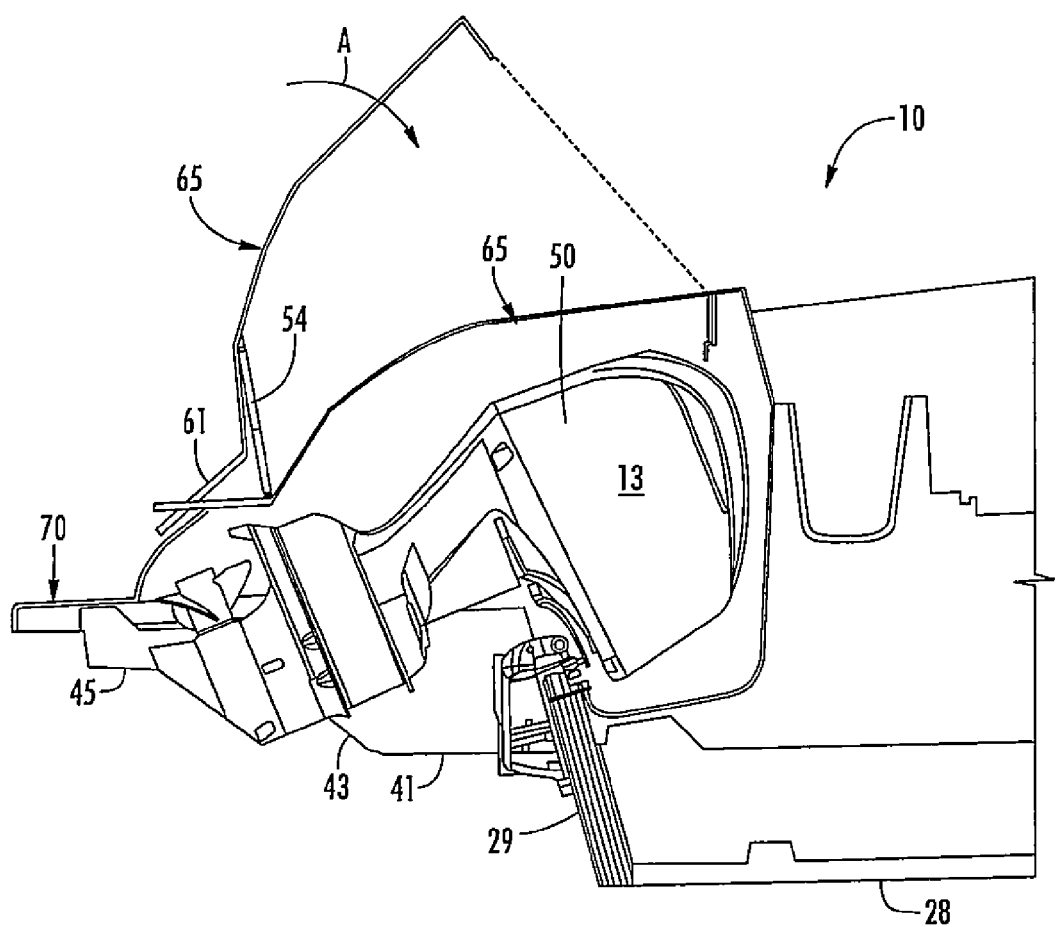
FIG. 11 is a cross-sectional view taken along the same plane as FIG. 10, but shown with an engine in a raised position.
Figure 12:
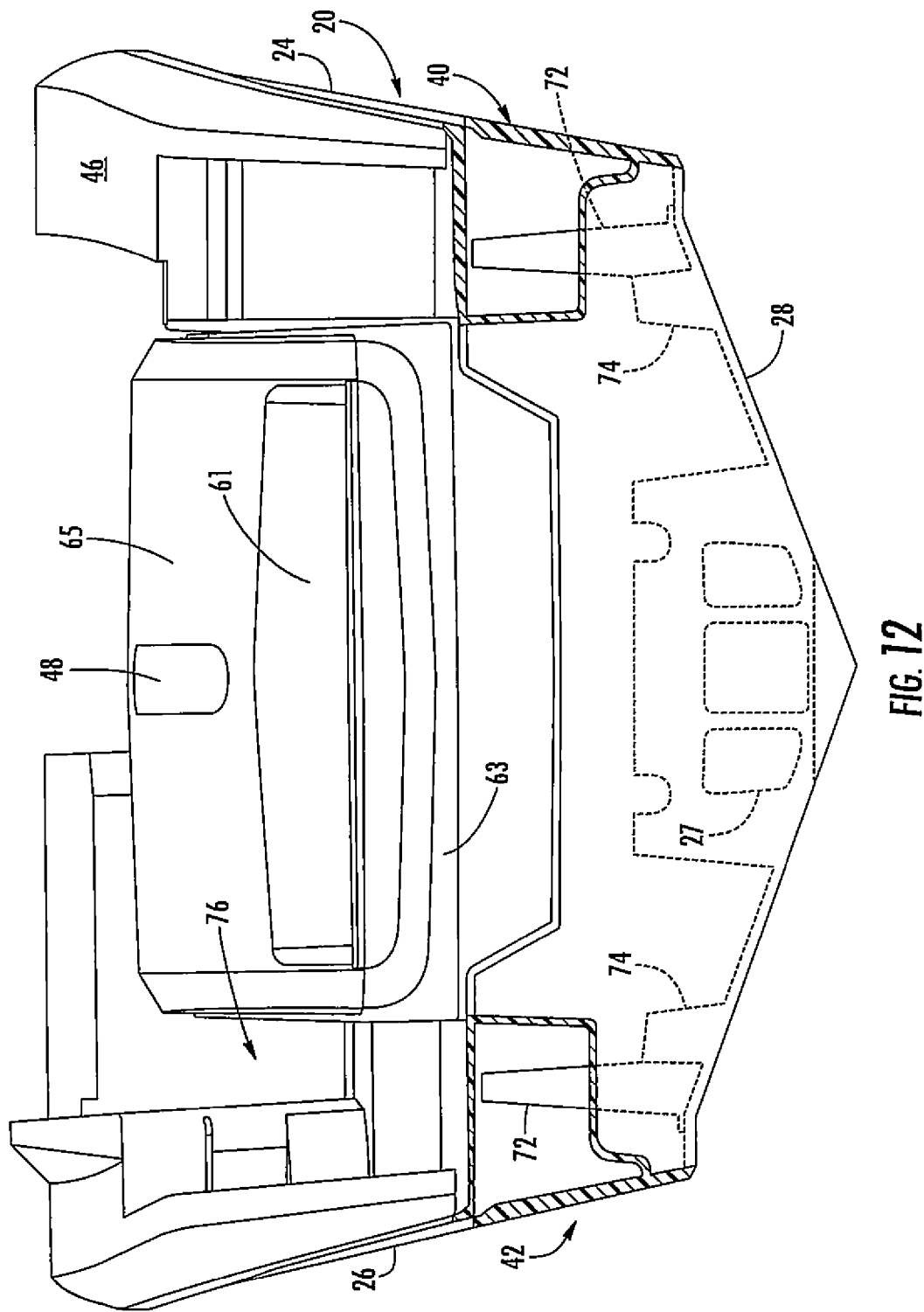
FIG. 12 is a rear elevational view, partly in phantom, showing the structural members for the extensions of the vessel.
Figure 15:
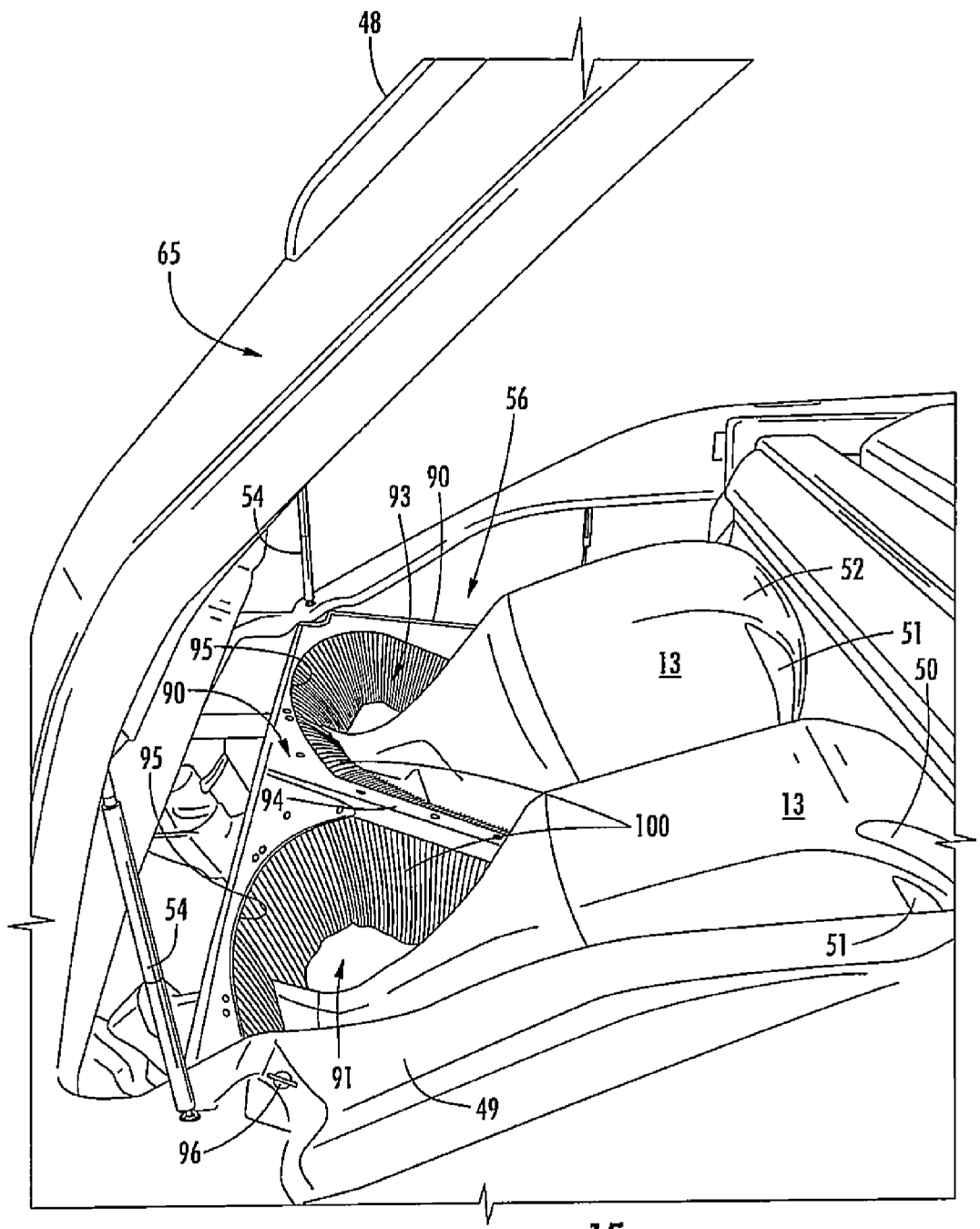
FIG. 15 is a right side perspective view of the engine well shown with the engines in a raised position.

Hull extensions 40, 42 each include an intermediate upwardly inclined aft extending section 43 and a generally horizontally extending aft third section 45 on both the starboard and port sides, which extend toward and behind engines 50, 52 a distance sufficient to allow the engine(s) to be fully raised, as seen in FIGS. 11 and 15, without contacting a swim platform 70 extending between hull extensions 40, 42. As best seen in FIG. 12, the hull extensions 40, 42 are fabricated with integrated stringers 74 and braces 72 in the hull 20 sufficient to support the weight of an engine cover 60 and integral swim platform 70 and several individuals using the swim platform and walkway 76. The hull may have a reinforcing grid 27 (FIG. 12), such as described in U.S. Pat. No. 8,191,495, the disclosure of which is incorporated herein by reference. Platform 70 can be fixedly secured between ends 45 of extensions 40, 42 or, as seen in FIG. 8, can be an integral part of an engine cover 60 for covering the engines 50, 52.

Engine cover 60 comprises a housing 62 with port and starboard side walls 64, 66 and a lower edge 68, which is secured to deck 30, as seen in FIG. 13, by a plurality of spaced-apart backed through bolts 69 and a conventional marine bedding compound 67. The deck 30 to hull 20 junction at extensions 40, 42 is also seen in FIG. 13 and includes a plurality of spaced-apart backed through bolts 31 and a marine bedding compound 33. Thus, the deck 30 and hull 20 have a watertight mechanical junction, as does the housing 62 of cover 60 to the deck 30.

Figure 10:
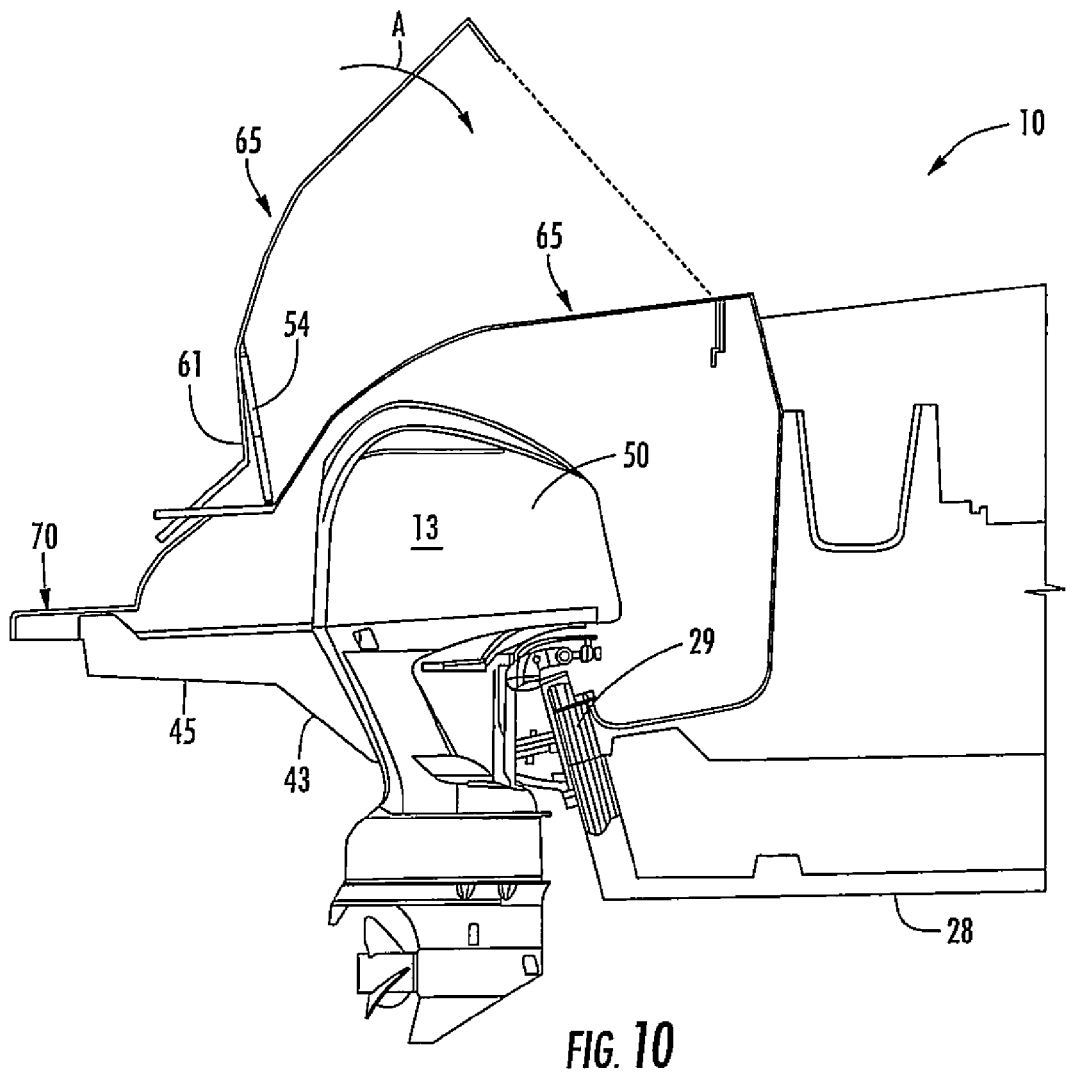
FIG. 10 is a cross-sectional view taken along section lines X-X of FIG. 9.

Cover 60 includes a hatch 65 which is hinged to an aft lower edge 63 (FIG. 1) of cover housing 62 by hinges 61 (FIG. 14) to open rearwardly, as illustrated in FIGS. 9-11, 14, and 15, providing access to engines 50, 52 for servicing. In FIGS. 10 and 11, the hatch is shown in open and closed positions and moves between these positions in an arc represented by arrow A in these figures. Gas springs 54 (FIGS. 10, 11, 14, and 15) extend between the hatch and the edge of the cover opening defining the motor well 56 behind the transom 29. Hydraulic or electrical struts could be employed for raising and lowering hatch 65. Hatch 65 includes an integrally molded aft-facing seat 61, which can be used in conjunction with swim platform 70. Platform 70 includes a stowable extendable swim ladder 71 (FIG. 6) to facilitate individual ingress and egress to and from the water. Hatch 65 also includes an upper air intake 48 for combustion air for the engines. The junction of the hatch 65 and the cover housing 62 also includes air inlets 49 (FIG. 15) on each side of the cover 60 to assist in providing combustion air.

Figure 7:
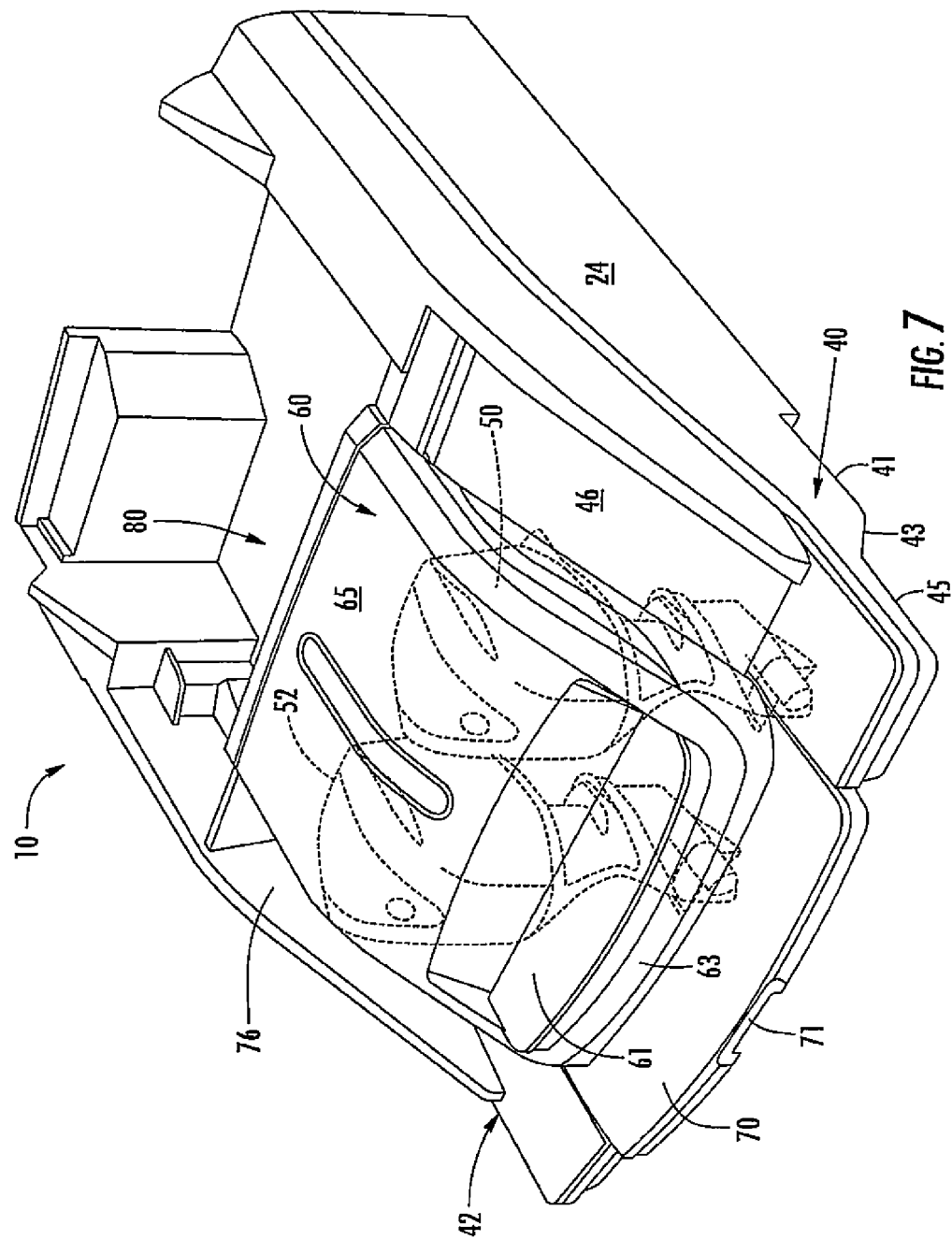
FIG. 7 is a fragmentary rear perspective view of the engine cover and hatch, shown with the engines in phantom form under the cover.

As seen particularly in FIG. 7 and in FIGS. 8-15, engines 50 and 52 fit within the open area or motor well 56 defined by the space between the hull extensions 40, 42, the transom 29, and the swim platform 70. This provides sufficient room, as illustrated in FIGS. 11 and 15, to allow engines 50 and 52 to be raised within the well 56 as desired for maintenance and/or shallow water running. The hull extensions 40, 42, including sections 41, 43, and 45, may include walkways, such as walkway 76 shown in FIGS. 1 and 4-7, to provide access to the swim platform 70 from the cockpit area 80 (FIG. 1) of the vessel. The upper surface 46 (FIGS. 1-3 and 5-9) of hull extension 40 is part of the deck 30 and is inclined downwardly toward section 45 to provide a streamlined appearance to the vessel 10.

Figure 14:
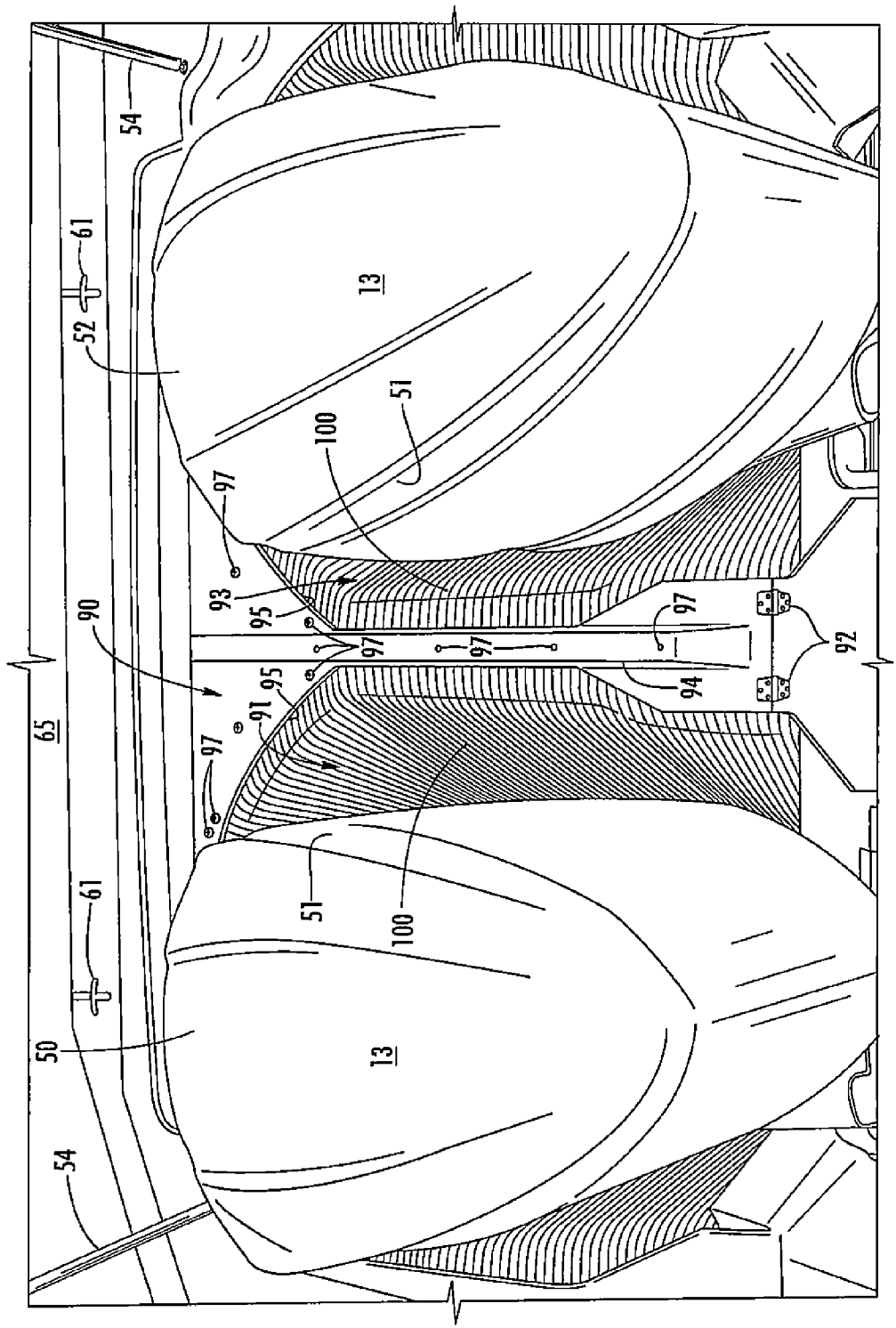
FIG. 14 is a top perspective view of the engine well illustrating the mist guards for the engines.

As seen in FIGS. 14 and 15, the engines 50, 52 are situated in the motor well 56 to which a pivoted mist-blocking frame 90 is hingedly mounted at hinges 92 at the forward end of the well 56. This allows the frame 90 to pivot between a raised position, as shown in FIGS. 14 and 15, and a lowered servicing position which allows access to remove the cowls 13 of engines 50 and 52 for servicing. The mist-blocking frame 90 includes a pair of apertures 91 and 93, which have edges 95 in spaced relationship to the engine cowls to allow the engine cowls 13 to extend through the apertures. Coupled to the edges 95 are flexible members 100, which extend from edges 95 into engagement with the cowls 13 of engines 50 and 52. In a preferred embodiment of the invention, the flexible members 100 comprise, as best seen in FIGS. 14 and 15, bristles of brushes which had a length of approximately 11-inches to 12-inches to extend between edges 95 of apertures 91 and 93 into contact with the cowl 13 of the engines 50, 52. The frame 90 positions the flexible members 100 in engagement with the cowl at an area near the lower end thereof, as seen in FIGS. 14 and 15, below the air intake 51 of each of the engines. The bristles employed in flexible member 100 can range in diameter size of from about 0.003-inches to 0.060-inches, depending upon the particular installation, although a diameter of 0.045-inches was successfully used in the test trials of the vessel 10. The bristles, as best seen in FIGS. 14 and 15, are attached to the edges 95 of apertures 91 and 93 of frame 90 by underlying strips of material sandwiching the brush bristles in place and held by fasteners 97. The use of the flexible members prevents water from interfering with engine performance while allowing the engines to be raised, lowered, and turned for steering the vessel through the apertures 91, 93 in mist-blocking frame 90.

Frame 90 typically will be made of fiberglass reinforced plastic (FRP), and the brushes will be mounted to the underside of frame 90 for aesthetic purposes. In the embodiment shown, frame 90 was made of 3/16-inch FRP and had an integral reinforcing rib 94 located between apertures 91, 93.

Instead of brush bristles employed for flexible member 100, other means of providing a spray or mist guard interface between the apertures 91, 93 in mist-blocking frame 90 and the engine cowls 13 can be employed. Thus, for example, a flexible rubber or other flexible membrane could be employed which allows the engine to be turned for steering and tilted for trimming during operation and the frame 90 lowered for servicing. Also, strips of semi-rigid polymeric materials likewise could be employed, although the bristles are extremely effective in preventing liquid from accumulating on the engines.

The mist-blocking frame 90, as best seen in FIGS. 14 and 15, is hinged by hinges 92 and latched in a raised operational position with a conventional latch 96 extending between the cover housing and frame 90. With the aft-facing end of frame 90 lowered, the cowls 13 on both engines 50 and 52 are fully exposed, allowing them to disengage from the bristles of member 100 and be removed for access to the engine components.

By providing a cowl mist shield of the present invention, the engines are protected against the deleterious effects of salt or fresh water spray entering the engine area and the cowl and air intakes of the engine while the vessel is running at operational speeds. The trim of the vessel can vary from 0° at idle to about 12° when on plane and the wake created by operational speeds together with the turbulence of the propellers of the engine may otherwise, in the enclosed engine environment of the vessel shown in these figures, reduce the life of the engines or their performance.

It will become apparent to those skilled in the art that various modifications to the preferred embodiment of the invention as described herein can be made without departing from the spirit or scope of the invention as defined by the appended claims.

The invention claimed is:

1. A vessel comprising:
a hull with a transom for holding at least one outboard engine;
spaced-apart separate starboard and port hull extensions formed on said hull and extending behind any outboard engines mounted to said transom; and
an engine cover positioned on said hull and over an outboard engine when mounted to said transom and supported, at least in part, by said hull extensions, said cover concealing said engine from view and including a hatch for providing access to the outboard engine.

2. The vessel as defined in claim 1 and further including a swim platform positioned between said hull extensions.

3. The vessel as defined in claim 2 wherein said swim platform is integrally formed at an aft end of said engine cover.

4. The vessel as defined in claim 1 wherein said hull extensions include a first generally horizontally extending section aft of said transom having a lower surface which joins said hull at a location below the waterline of the vessel and above the bottom of the hull, an intermediate section aft of said transom and extending from said first section in an upwardly inclined aft-facing direction, and a third generally horizontal section aft of said transom and coupled to said intermediate section and extending aft beyond said transom.

5. The vessel as defined in claim 4 wherein each of said hull extensions have an upper surface that is inclined downwardly in an aft direction to join with one of said intermediate or third sections of said hull extensions.

6. The vessel as defined in claim 1 and further including at least a pair of outboard engines mounted to said transom.

7. A vessel comprising:
a hull with a bottom and a transom; and
starboard and port hull extensions formed on said hull and extending behind said transom wherein said hull extensions include a first horizontally extending section having a lower surface which joins said hull at a location below the waterline of the vessel but above the surface of the bottom of said hull, said first section located aft of said transom, an intermediate section aft of said transom and extending from said first section in an upwardly inclined aft-facing direction, and a third generally horizontal section aft of said transom and coupled to said intermediate section and extending aft.

8. The vessel as defined in claim 7 wherein said hull extensions are spaced apart a distance to allow at least a pair of outboard engines to be mounted to said transom and clear said hull extensions during use.

9. The vessel as defined in claim 8 wherein said hull extensions extend aft a distance to clear the rear of any outboard engines mounted to said transom.

10. The vessel as defined in claim 9 and further including a swim platform positioned between said hull extensions.

11. The vessel as defined in claim 10 wherein at least one of said hull extensions includes a walkway providing access to said swim platform.

12. The vessel as defined in claim 11 and further including an engine cover supported at least in part by said hull extensions.

13. The vessel as defined in claim 12 wherein said swim platform is integrally formed on said engine cover.

14. A vessel comprising:
a hull with a bottom and a transom and a plurality of outboard engines mounted to said transom;
starboard and port hull extensions formed on said hull and extending behind said transom wherein said hull extensions include a first horizontally extending section located aft of said transom and having a lower surface which joins said hull at a location below the waterline of the vessel but above the surface of the bottom of said hull, an intermediate section aft of said transom and extending from said first section in an upwardly inclined aft-facing direction, and a third generally horizontal section aft of said transom coupled to said intermediate section and extending aft;
wherein said hull extensions are spaced apart a distance to allow said plurality of outboard engines to clear said hull extensions during use, and wherein said hull extensions extend aft a distance to clear the rear of said outboard engines mounted to said transom; and
a swim platform positioned between said hull extensions.

15. The vessel as defined in claim 14 wherein at least one of said hull extensions includes a walkway providing access to said swim platform.

16. The vessel as defined in claim 14 and further including an engine cover supported at least in part by said hull extensions.

17. The vessel as defined in claim 16 wherein said engine cover includes a hatch for gaining access to said engines.

18. The vessel as defined in claim 17 wherein said swim platform is integrally formed on said engine cover.

19. A vessel comprising:
a hull with a transom for holding at least one outboard engine having a cowl;
an engine cover positioned over an outboard engine when mounted to said transom; and a mist shield surrounding said engine cowl, said shield having edges spaced from said cowl and a flexible member extending from said edges into engagement with said engine cowl.

20. The vessel as defined in claim 19 and further including starboard and port hull extensions formed on said hull and extending behind any outboard engines mounted to said transom.

21. The vessel as defined in claim 19 wherein said flexible member is semi-permeable.

22. The vessel as defined in claim 21 wherein said flexible member comprises bristles of a brush extending from said edges of said mist shield to said cowl.

23. The vessel as defined in claim 22 wherein said mist shield includes a frame mounted to said vessel and having an aperture which surrounds said engine with said edges located at the boundary of said aperture.

24. The vessel as defined in claim 23 wherein said bristles are attached to said frame and extend substantially around said aperture.

25. The vessel as defined in claim 24 wherein said engine cowl has an air intake and said frame locates said bristles in a position on said cowl below said air intake.

26. The vessel as defined in claim 25 wherein said frame is pivotally mounted to said vessel to move between an operative position and a service position in which access to said cowl for servicing said engine is possible.

27. The vessel as defined in claim 19 and further including a plurality of engines mounted to said transom and wherein said mist shield has a frame with a plurality of apertures for surrounding said engines.

28. A vessel comprising:
 a hull with a transom for holding at least one outboard engine having an engine cowl;
 starboard and port hull extensions formed on said hull and extending behind any outboard engines mounted to said transom;
 an engine cover positioned over an outboard engine when mounted to said transom; and
 a mist shield surrounding said cowl, said shield having edges spaced from said cowl and a flexible member extending from said edges into/engagement with said cowl.

29. The vessel as defined in claim 28 wherein said mist shield includes a frame mounted to said vessel and having an aperture which surrounds said engine with said edges located at the boundary of said aperture.

30. The vessel as defined in claim 29 wherein said frame is pivotally mounted to said vessel to move between an operative position and a service position in which access to said cowl for servicing said engine is possible.

31. The vessel as defined in claim 30 wherein said flexible member comprises bristles of a brush extending from said edges of said mist shield to said cowl.

32. The vessel as defined in claim 28 and further including a plurality of engines mounted to said transom and wherein said mist shield has a plurality of apertures for surrounding said engines.

33. A vessel comprising:
 a hull with a transom for holding a plurality of outboard engines having cowls;
 spaced-apart starboard and port hull extensions formed on said hull and extending behind outboard engines mounted to said transom, said extensions not affecting the performance characteristics of the vessel; and
 an engine cover positioned over outboard engines when mounted to said transom, said cover enclosing and concealing outboard engines from view.

34. A vessel comprising:
 a hull with a transom for holding a plurality of outboard engines having cowls;
 starboard and port hull extensions formed on said hull and extending behind outboard engines mounted to said transom; and
 an engine cover positioned over said outboard engines when mounted to said transom and further including a mist shield surrounding said cowls, said shield having apertures with edges spaced from said cowls and brushes extending from said edges into engagement with said cowls.

35. The vessel as defined in claim 34 wherein said mist shield includes a frame mounted to said vessel.

36. The vessel as defined in claim 35 wherein said frame is pivotally mounted to said vessel to move between an operative position and a service position in which access to said cowls for servicing said engines is possible.

37. The vessel as defined in claim 36 wherein said cowls have air intakes and said frame locates said brushes in a position on said cowl below said air intake.

\* \* \* \* \*